(12) United States Patent
Klassen et al.

(10) Patent No.: US 7,353,350 B2
(45) Date of Patent: Apr. 1, 2008

(54) DATA STORE MANAGEMENT SYSTEM AND METHOD FOR WIRELESS DEVICES

(75) Inventors: Gerhard D. Klassen, Waterloo (CA); Robbie J. Maurice, Waterloo (CA)

(73) Assignee: Research In Motion Limited, Waterloo (CA)

( * ) Notice: Subject to any disclaimer, the term of this patent is extended or adjusted under 35 U.S.C. 154(b) by 328 days.

(21) Appl. No.: 10/521,872

(22) PCT Filed: Jul. 23, 2003

(86) PCT No.: PCT/CA03/01104

§ 371 (c)(1), (2), (4) Date: Jan. 21, 2005

(87) PCT Pub. No.: WO2004/010306

PCT Pub. Date: Jan. 29, 2004

(65) Prior Publication Data

US 2005/0239494 A1 Oct. 27, 2005

(51) Int. Cl.
*G06F 12/12* (2006.01)
(52) U.S. Cl. .................. 711/159; 711/147; 711/151; 711/160; 711/171; 711/172
(58) Field of Classification Search .............. 711/147, 711/151, 152, 159, 160, 170, 171
See application file for complete search history.

(56) References Cited

U.S. PATENT DOCUMENTS

| | | | |
|---|---|---|---|
| 5,640,339 A | | 6/1997 | Davis et al. |
| 6,212,605 B1 * | | 4/2001 | Arimilli et al. ............. 711/133 |
| 6,285,872 B1 | | 9/2001 | Murata |
| 7,017,105 B2 * | | 3/2006 | Flanagin et al. ............. 714/798 |
| 2004/0158829 A1 * | | 8/2004 | Beresin et al. ............. 717/178 |

FOREIGN PATENT DOCUMENTS

| | | |
|---|---|---|
| EP | 0 833 252 A2 | 4/1998 |
| EP | 0 833 252 A3 | 4/1998 |
| EP | 1 067 749 A2 | 1/2001 |
| EP | 1 067 749 A3 | 1/2001 |
| EP | 1 187 432 A1 | 3/2002 |

OTHER PUBLICATIONS

"Automatic Removal of Old Calendar Information from the PC", IBM Technical Disclosure Bulletin, Nov. 1992, US, vol. 35, issue 6, pp. 412-413.*
Chapter 4: Memory Management, CMPS 111, UC Santa Cruz (11 pgs).

* cited by examiner

Primary Examiner—Matthew Kim
Assistant Examiner—Hetul Patel
(74) Attorney, Agent, or Firm—Jones Day; Krishna K. Pathiyal; Robert C. Liang

(57) ABSTRACT

In accordance with the teaching described herein, systems and methods are provided for managing memory space in a mobile device. A plurality of data storage locations may be included. A plurality of software applications may be included, with each software application being operable to store data to a different data storage location. A data store management system may be operable to access and delete data stored in the plurality of data storage locations. If insufficient memory space is available in one of the data storage locations, then the data store management system may access the one data storage location and at least one other data storage location and delete data from at least one of the accessed data storage locations.

12 Claims, 8 Drawing Sheets

DATA STORE MANAGEMENT SYSTEM AND METHOD FOR WIRELESS DEVICES

TECHNICAL FIELD

The technology described in this patent document relates generally to the field of data stores. More particularly, the patent document describes a data store management system and method that is particularly well-suited for use with a mobile communication device, such as a wireless two-way messaging device, a cellular telephone, a personal digital assistant (PDA), or other mobile communication device having limited memory space.

BACKGROUND ART

Known mobile communication devices typically have limited memory space relative to personal computers (PCs). PCs, including laptop and desktop computers, for example, normally have at least tens of megabytes (Mb) of random access memory (RAM) in addition to gigabytes of other storage, such as one or more hard disk drives. However, due mainly to power supply and physical space limitations, mobile communication devices are typically provided with much less memory than PCs. Due to the limited memory resources on a typical mobile communication device, enhanced device applications, such as electronic messaging, web browsing, calendar management, and the like, may quickly exhaust available memory space. Thus, typical mobile communication devices often employ memory management functions to make better use of available memory resources. For example, when additional memory space is require in a typical mobile communication device, the device's memory management system may delete oldest or least-used data from memory to make room for new information.

DISCLOSURE OF INVENTION

In accordance with the teaching described herein, systems and methods are provided for managing memory space in a mobile device. A plurality of data storage locations may be included. A plurality of software applications may be included, with each software application being operable to store data to a different data storage location. A data store management system may be operable to access and delete data stored in the plurality of data storage locations. If insufficient memory space is available in one of the data storage locations, then the data store management system may access the one data storage location and at least one other data storage location and delete data from at least one of the accessed data storage locations.

BEST MODE FOR CARRYING OUT THE INVENTION

Figure 1:
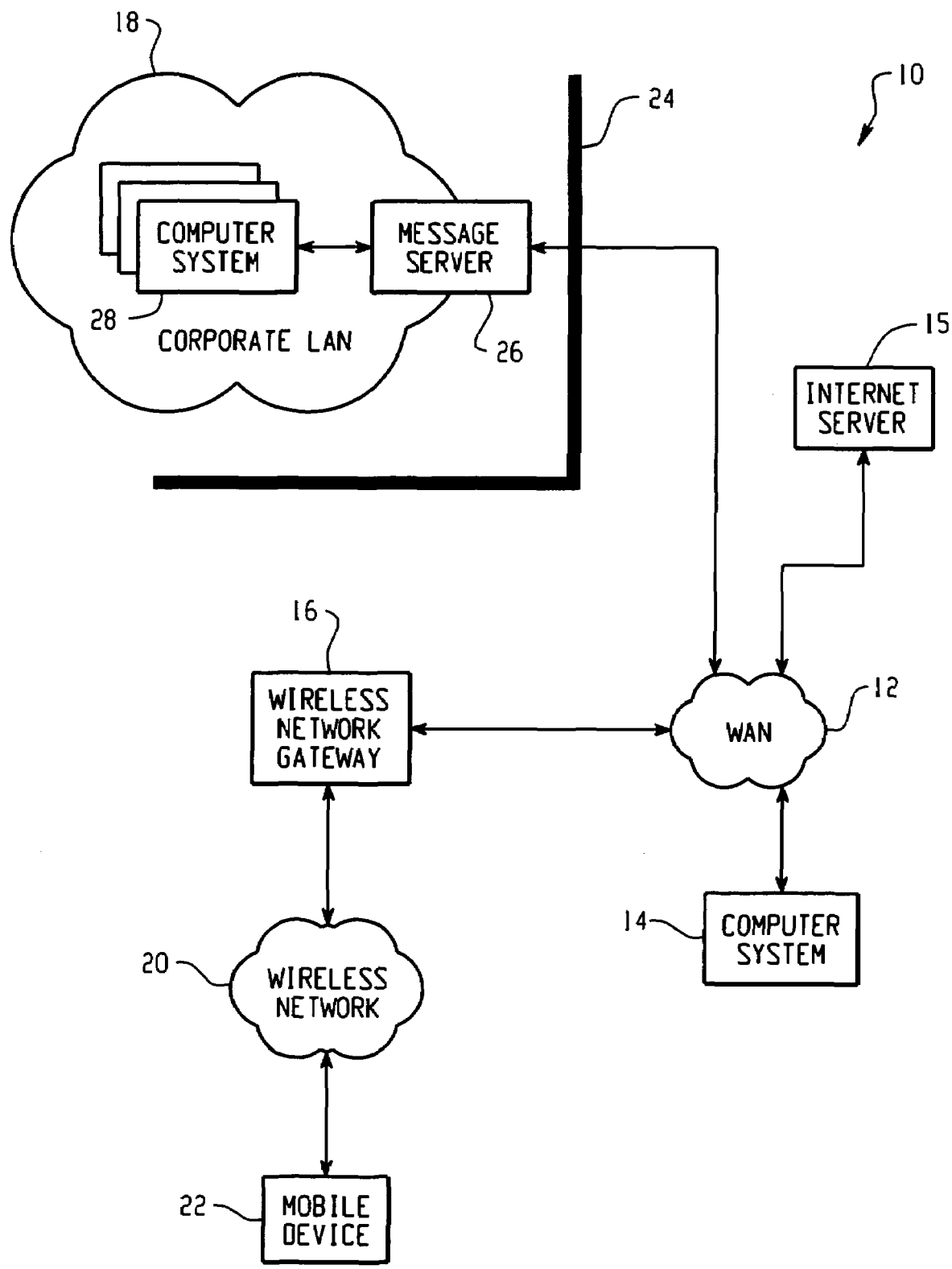
FIG. 1 is a block diagram of a communication system in which a mobile communication device may be configured to operate.

With reference now to the drawing figures, FIG. 1 is a block diagram of a communication system in which a mobile communication device ("mobile device") may be configured to operate. The system 10 in FIG. 1, includes a wide area network (WAN) 12, to which a computer system 14, an Internet server 15, a wireless network gateway 16 and a corporate local area network (LAN) 18 are connected. The wireless network gateway 16 is also connected to a wireless communication network 20 in which a mobile device 22 is configured to operate.

The computer system 14 represents a desktop or laptop PC which is configured for connection to the WAN 12, which will typically be the Internet.

The Internet server 15 may be any system from which content such as web pages may be downloaded. Access to content associated with an Internet server 15 is normally accomplished using a browser through which content may be requested from the Internet server 15. Alternatively, the Internet server 15 may be configured to send or "push" content to a destination, such as the mobile device 22 or computer system 14, without first receiving a request.

The illustrated corporate LAN 18 is a network-based messaging system, although LANs may support other types of services. As shown, the corporate LAN 18 is located behind a security firewall 24. Within the corporate LAN 18 is a message server 26 that executes on a computer within the firewall 24, and functions as an interface for the corporation to exchange messages both within the LAN 18 and with other external messaging clients via the WAN 20. The message server 26 may be used in conjunction with Internet mail routers to route and deliver mail. A message server 26 may also provide functionality in addition to standard message sending and receiving functions. For instance, the message server 26 may also function as a dynamic database storage engine having predefined database formats for data, such as calendars, to do lists, task lists, e-mail and documentation.

The message server 26 provides messaging capabilities and possibly other services to network computer systems 28 in the LAN 18. A typical LAN includes multiple computer systems, shown generally at 28, each of which implements a messaging system. In the network 18, messages that are received by the message server 26 and addressed to users or user accounts associated with the message server 26 are distributed to appropriate user account mailboxes, and can then be accessed by a user through a messaging system on a computer system 28. Messages may similarly be sent from a messaging system operating on a computer system 28 via the message server 26.

The wireless gateway 16 provides an interface to a wireless network 20 through which messages may be exchanged with a mobile device 22. Such functions as addressing a mobile device 22, encoding or otherwise transforming messages for wireless transmission, and other interface functions may be performed by the wireless gateway 16. Where the wireless gateway is configured to operate with more than one wireless network 20, the wireless gateway 16 may also determine a most likely network for locating a given user and may track users roaming between countries or networks.

Computer systems with access to the WAN 12 may exchange data, such as e-mail messages, with a mobile device 22 through the wireless network gateway 16. Private wireless network gateways, such as wireless virtual private network (VPN) routers, may also be implemented to provide a private interface to a wireless network 20. For example, a wireless VPN implemented in the LAN 18 may provide a private interface from the LAN 18 to one or more wireless mobile devices 22 through the wireless network 20. Such a private interface to mobile devices via the wireless network gateway 16 and/or the wireless network 20 may also be extended to entities outside of the LAN 18 by providing a message or content forwarding system that operates with the LAN 18. For example, incoming messages received by the message server 26 and addressed to a mobile device 22 may be redirected through the wireless network interface (e.g., a wireless VPN router, gateway 16 or other interface) to the wireless network 20 and to the mobile device 22.

In wireless networks 20, messages are typically delivered to and from mobile devices 22 via RF transmissions between base stations (not shown) and mobile devices. It should be understood that the term "wireless network," as used herein, includes different types of networks, such as data-centric wireless networks, voice-centric wireless networks and dual-mode networks that support both voice and data communications over the same physical base stations.

The mobile device 22 may be a data communication device, a voice communication device, or a multiple-mode device capable of voice, data and other types of communications. An exemplary mobile device 22 is described in further detail below with reference to FIG. 5.

Figure 2:
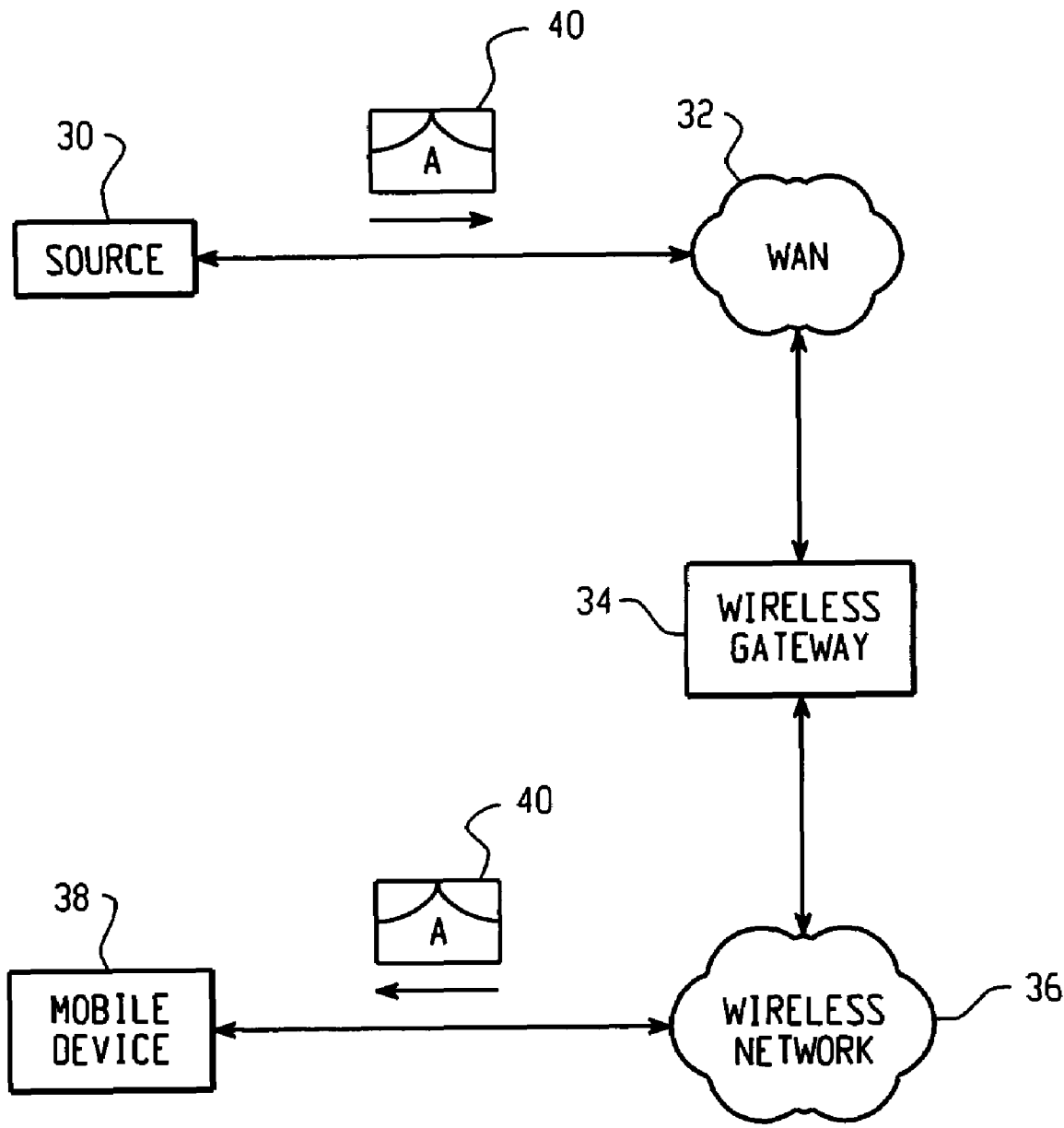
FIG. 2 is a block diagram illustrating a transfer of a data item to a mobile communication device.

FIG. 2 is a block diagram illustrating the transfer of a data item 40 to a mobile device 38. FIG. 2 illustrates only those components of the messaging system that are involved in an example data transfer between a source 30 and the mobile device 38. It should be understood, however, that other components may also be present in the overall communication system and may be involved in routing a message from a source 30 to a mobile device 38.

The system in FIG. 2 includes a data source 30, configured for access to a WAN 32. Also shown is a wireless gateway 34 that provides an interface to a wireless network 36 in which the mobile device 38 is adapted to operate.

The source 30 may, for example, be a PC 14, an Internet server 15, or a network-connected computer 28, as shown in FIG. 1. The source 30 may also be a mobile device on which data, such as an e-mail message, may be composed and sent. In general, the source 30 may be any device or system which may send data to the mobile device 38, including secure systems behind a firewall 24 where the mobile device 38 or its user is authorized to access corporate or other protected information. It should be understood, therefore, that a data item 40 may also be sent to the mobile device 38 through communication paths other than that illustrated in FIG. 2. For example, if the source 30 is another mobile device that operates within the same wireless network 36 as the mobile device 38, then a data item may be sent to the mobile device 38 through the wireless network 36 without passing through the WAN 32 or the wireless gateway 34.

The data item 40 may include any of a plurality of different types of data, depending upon the types of data item that the mobile device 38 is configured to process. In most cases, a mobile device will be configured to receive and process types of data items associated with software applications operating on the mobile device. As described above, the data item 40 may be sent to the mobile device 38 in response to a request or may be "pushed" to the mobile device 38 by the source 30 without first having received a request.

When the mobile device includes a messaging system, the data item 40 may be an e-mail message sent from a messaging system at a computer system 14 or forwarded to the mobile device 38 by a message server 26, as described above. Where the messaging system also supports a calendar function, the data item may similarly be a new or updated appointment. If a browser is installed on the mobile device 38, then the data item 40 may be a Hypertext Transfer Protocol (HTTP) response to an HTTP request previously sent from the mobile device 38 to the source 30. It should be understood, however, that the data item 40 could include any type of data that the mobile device 38 or a mobile device software application is configured to process.

Figure 3:
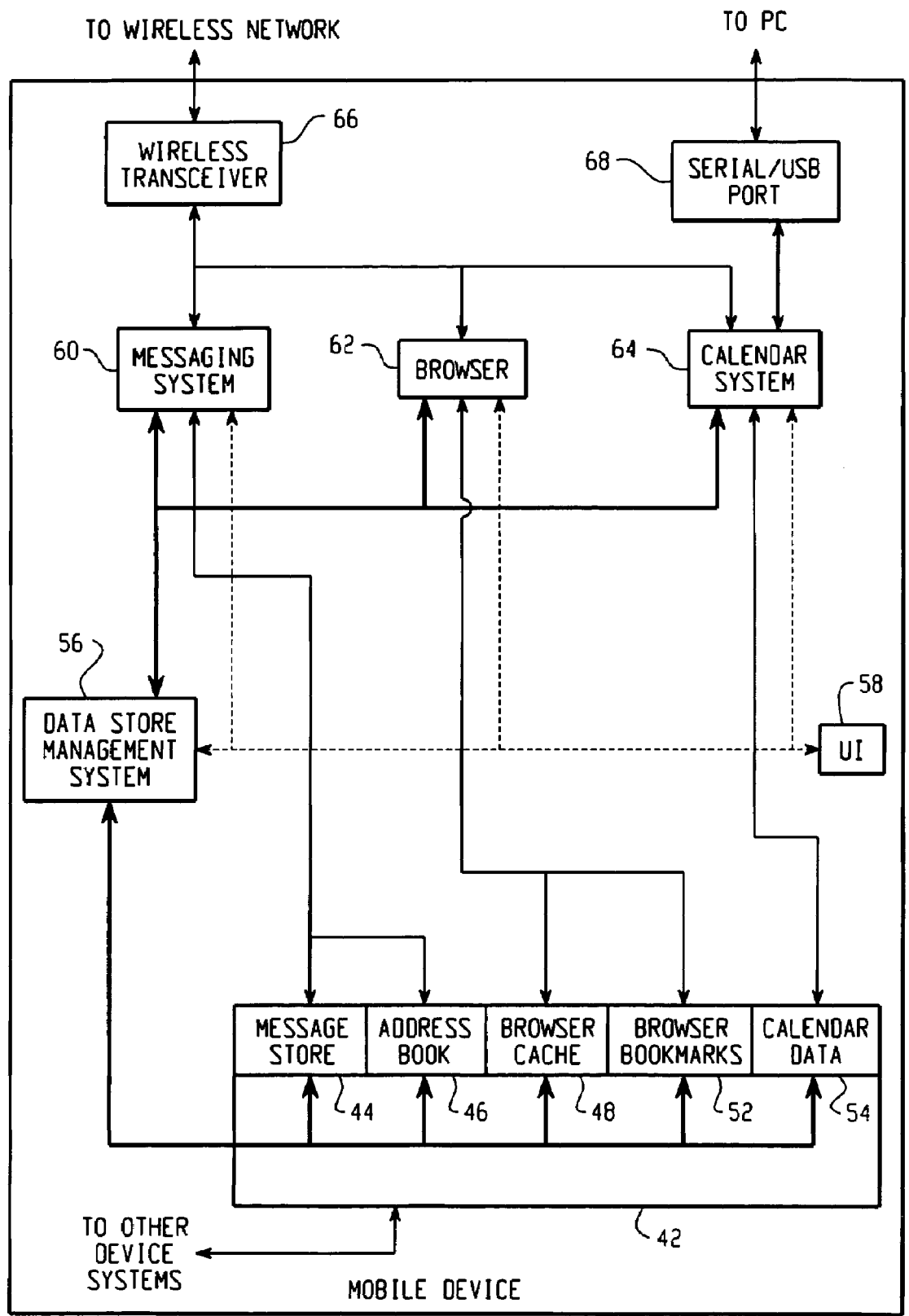
FIG. 3 is a block diagram of a mobile communication device with an example data store management system.

FIG. 3 is a block diagram of a mobile device 50 with an example data store management system 56. As shown in FIG. 3, a mobile device 50 incorporating a data store management system 56 may include a memory 42, a data store management system 56, a user interface (UI) 58, a messaging system 60, a browser 62, a calendar system 64, a wireless transceiver 66, and a serial or universal serial bus (USB) port 68. The memory 42 may include a plurality of different storage areas or data stores, shown in FIG. 3 as a message store 44, an address book store 46, a browser cache 48, a browser bookmarks store 52, and a calendar data store 54. It should be understood, however, that fewer or additional data stores may also be provided in the mobile device 50. In addition, the data stores shown in FIG. 3 may instead be provided, possibly in addition to other data stores, in separate memory components in the mobile device 50.

The memory 42 may be a writeable store, such as a RAM, into which other device components may write data. The message store 44 may be a storage area for storing messages on the mobile device 50. Received, sent, and saved messages may all be stored in the message store 44. The address book 46 may store contact information for entities with whom a user of the mobile device 50 may exchange messages. The address book may also store physical addresses, mailing addresses and other contact information in addition to electronic messaging information. The browser cache 48 stores previously downloaded content associated with Internet web pages that have been accessed by the browser 62. In the browser bookmarks store, web page addresses or other identifiers of content sources may be stored and recalled when the content or source is to be accessed. The calendar data store 54 stores information such as appointments and reminders. The memory 42 may also be used by other device systems in addition to those shown in FIG. 3. Although the data stores 44-54 are shown as discrete blocks within the memory 42, it should be understood that each data store may not necessarily be of a fixed size. That is, where memory space is available in the memory 42, each data store may expand as new data is written to the data store, possibly until an upper data store size limit is reached.

The data store management system 56 manages the plurality of data stores 44-54 in the memory 42. Its operation will be described in further detail below.

Input and output devices which accept inputs from or provide outputs to a user of the mobile device 50 are designated generally in FIG. 3 as the user interface (UI) 58. The UI 58 may include input components, such as a keypad, a keyboard, a microphone, a trackball, a thumbwheel, a rocker switch, and one or more function keys, and may also include output components, such as a display screen and a speaker.

The messaging system 60, browser 62 and calendar system 64, which may be implemented as software modules, hardware modules, or a combination of both, are operable to store and retrieve data to and from the data stores 44-54. The messaging system 60 may, for example, support e-mail communications between the mobile device 50 and other entities through the wireless transceiver 66. The browser 62 may provide access to remote content and resources, and may be a wireless application protocol (WAP) browser, an HTTP browser, or some other type of browser. The calendar system 64 may support operations such as setting and viewing appointments and providing appointment reminders. In some mobile devices, a single software application may incorporate some or all of the functionality of a messaging system, browser, and calendar system. Mobile devices may also include more or fewer software applications than shown in FIG. 3.

The wireless transceiver 66 enables the messaging system 60, browser 62 and calendar system 64 to receive and possibly send information through a wireless network. The serial or USB port 68 provides another communication link through which information may be received and possibly sent to a PC. A serial or USB port 68 is often used to transfer personal information management (PIM) data between a user's PC and mobile device. Although shown as connected to the calendar system 64 and the calendar data store 54, it should be understood that the port 68 may be connected to other device systems.

In operation, the messaging system 60 is configured to receive messages via the wireless transceiver 66 and store the messages in the message store 44. The mobile device 50 may also retrieve stored messages from the message store 44 for display on a UI 58, such as a display screen. The messaging system 60 may also allow a user to forward, reply to, or otherwise process a stored message. When a new message is composed on the mobile device 50 using the messaging system 60, the new message may also be stored to the message store 44. Recipients for messages to be sent from the mobile device 50 may be selected from the address book 46. Commands may be input to the messaging system 60 via a UI 58 to execute functions, such as updating contacts in an address book 46. Most messaging systems also allow the addition of new contacts to the address book 46 based on contact information in received messages.

Similarly, content accessed through the browser 62 may be stored in the browser cache 48 and presented to a user. Content may be "pushed" to the mobile device 50, or requested from an information source. For example, a user may enter a Universal Resource Locator (URL), IP address or other identifier associated with an information source from which content is to be downloaded. Alternatively, such an identifier may be selected from the browser bookmarks store 52. Requests for content may also be stored to the browser cache 48, for example, until a corresponding response is received.

By storing content in the browser cache 48, previously viewed content may be displayed more quickly on the mobile device 50. Latency in wireless networks may result in delays between a request for content from a source, such as an Internet server, and the receipt of content from the source. When previously viewed content that is stored in the browser cache 44 is to be viewed again, such as by using a "back" operation of the browser 62, it may be retrieved from the browser cache 44 instead of being downloaded over the wireless network.

The browser bookmarks store 52 may also be maintained by a user through a UI 58 and the browser 62. Bookmarks may be updated or deleted, and new bookmarks may be stored to the bookmarks store 52. New bookmarks may be entered manually using a UI 58. In addition, a URL, IP address or other identifier associated with saved or currently displayed content may be selected and stored to the bookmarks store 52.

Calendar data may also be received, sent, created, manipulated, stored to the calendar data store 54 and retrieved from the data store 54 by the calendar system 64. When new or updated calendar data is received by the calendar system 64 from the wireless transceiver 66 or the serial/USB port 68, the calendar system 64 may store received calendar data to the calendar data store 54. As described above in the context of messages, calendar data may be pushed to a mobile device 50 or returned to the mobile device 50 in response to a request. Stored calendar data may be retrieved from the calendar data store 54 and displayed on a UI 58.

Thus, data may be stored to and retrieved from each of the data stores 44-54. Storage operations may proceed without problems provided that sufficient space is available in the memory 42 to store a data item that is to be written into one of the data stores. However, the memory 42 is also typically used to store software applications that are installed on the mobile device 50, as well as data associated with other mobile device systems. Therefore, the amount of memory space available to the data stores 44-54, and thus the total amount of data that can be stored to the data stores 44-54, is limited. When available memory space in the memory 42 becomes low, data cannot be written to the data stores until memory space is freed, normally by deleting data from a data store.

The data store management system 56 is operated to manage the deletion of data from the data stores in order to provide additional available storage space when the amount of storage space in the memory 42, or one or more of the data stores 44-54 therein, is not sufficient to store data items to be written to the memory 42 or the data stores 44-54. In the example mobile device 50, the messaging system 60, browser 62 and calendar system 64 are connected to the data store management system 56. When a data item is to be written to a data store by the messaging system 60, browser 62 or calendar system 64, the data store management system determines whether additional space is required to write the data item to the memory 42.

One or more of the data stores 44-54 may be configured to expand as new data is written to the data store, resulting in an unequal allocation of available memory space between the data stores 44-54. For example, when the mobile device 50 is first loaded with address book data and calendar data, the address book 46 and calendar data store 54 may to be significantly larger than other data stores 44, 48. However, as device operation continues, other data stores, such as the message store 44, may increase in size disproportionately.

The data store management system 56 performs data store management operations across multiple data stores. When data is to be written to one of the data stores 44-54, the memory management system 56 may, for example, delete least-recently-used data from one or more of the data stores. This type of data store management effectively adapts the data stores in accordance with mobile device usage patterns.

For example, when a message is received by the messaging system 60, and is to be written to the message store 44, the data store management system 56 determines whether additional storage space is required to write the message to the message storage location 44. If sufficient storage space is available to perform the write operation, then the message is written to the message store 44. Data items such as a message may be written to the appropriate store by either the data store management system 56 or the associated system or software application, the messaging system 60 in the case of a message. For example, a system or application may pass a data item to be written to the data store management system 56, which determines whether additional space is required, deletes data from one or more stores if required, and writes the data to the appropriate store.

Alternatively, the system or application that has data to be written to a data store may communicate with the data store management system 56 by sending a control signal to the data store management system 56 indicating that data is to be written to a particular data store. The data store management system 56 may then determine whether additional memory space is required for the write operation, free additional space in the memory 42 if necessary, and return an indication to the system or application that the data can now be written to the data store. In addition, a system or application that has data to be written to a data store may determine whether additional memory space is required for the write operation. In this case, the system or application may communicate with the data store management system 56 where additional memory space is required. The data store management system 56 may then free the additional required memory space by deleting data from one or more of the data stores 44-54, and either write the data to the appropriate data store or provide an indication to the system or application that the data may be written to the data store. In another example, the data store management system 56 may support more than one write operation schemes, such that different systems or applications may be configured to perform different types of write operations.

Where the data store management system 56 is implemented as a software module or application, data store management functions may be invoked by a system or application on the mobile device 50 by executing the data store management system 56 when data is to be written to a data store. A software implementation of the data store management system 56 may also support different function calls, for example, to support different data store management operations. A mobile device system or application may make a corresponding function call to the data store management system 56 depending upon which component determines whether additional memory space is required, and also depending upon which component writes data to a data store.

The data store management system 56 is configured to access data in at least two of the data stores 44-54 when additional memory space is required to perform a write operation. For example, if a message is to be written to the message store 44, then the data store management system 56 may access not only the message store 44 or a pre-selected data store, but also another data store, such as the browser cache 48 and/or the calendar data store 54. Any expired or invalid data in the data stores 44, 48 and 54 may then be deleted, since such data will not likely be needed by a user. Expired data may include, for example, certain types of messages in the message store 44, expired web pages or responses stored in the browser cache 48, and appointments in the calendar data store 54 that occurred in the past. For example, an HTTP response may include an indication of a date and/or time after which any information content associated with the response is not considered valid. Other types of responses or content stored in the browser cache 48, or possibly other data stores in the memory 42 or another memory (not shown) in the mobile device 42 may also have associated validity periods or expiry times. For example, a mobile device enabled for secure communications may include a data store for digital Certificates, which also commonly include an expiry time or validity period, associated with other secure communication devices or systems. Stored data for which a validity period or expiry time has elapsed is considered expired or invalid. The data store management system 56 may free sufficient additional memory space by deleting only expired or invalid data from multiple data stores. For example, even though a message is to be written to the message store 44, the data store management system 56 may locate and delete expired or invalid data from the message store 44, the browser cache 48 and/or the calendar data store 54.

If the deletion of expired or invalid data provides sufficient memory space for a write operation, then a data item may be written to the appropriate data store by the data store management system 56 or the system or software application associated with the data item. For a message, the messaging system 60 or the data store management system 56 may write the message to the message store 44. If the data store management system 56 performs the write operation, then it may determine into which data store a data item is to be written based on the type of data item, the system or application by which the data item was provided, or possibly an identification of a data store provided by a system or application.

In some cases, the data store management system 56 may not find any expired or invalid data for deletion, or the deletion of invalid or expired data may not provide sufficient memory space for a current write operation. This situation may occur, for example, when expired or invalid data was recently deleted in a previous write operation. In addition, the data store management system 56 may not be configured to delete expired or invalid data. The data store management system 56 may instead be configured to delete expired or invalid data only if a certain time has elapsed since the operation was last performed. If expired or invalid data items had been deleted within one day of the current date, for example, then it is unlikely that a significant amount of data has since expired or become invalid, and this operation may be bypassed.

If further memory space is required, then the data store management system 56 again accesses multiple data stores, which may or may not be the same data stores accessed to locate and delete expired or invalid data, to identify least recently used data among the data stored in the multiple data stores. Least recently used criteria, such as a maximum time period since most recent access, may be predetermined criteria that is incorporated into the data store management system 56. Alternatively, the lease recently used criteria may be configurable by a user of the mobile device 50. For example, a user may specify least recently used criteria settings through a UI 58. Such settings may also be established using a utility or software application on a PC and loaded onto the mobile device through the serial/USB port 68. It is also contemplated that these settings may be provided from a remote system, such as an administrator system in a corporate network, for example, through the wireless transceiver 66.

The data store management system 56 identifies and deletes any data that has not been accessed within the maximum time period, or since a particular control date. When such data has been deleted, the data store management system 56 may determine whether still further additional memory space is required for the write operation. The process of locating and deleting least recently use data may be repeated as often as necessary until the write operation can be performed.

Figure 4:
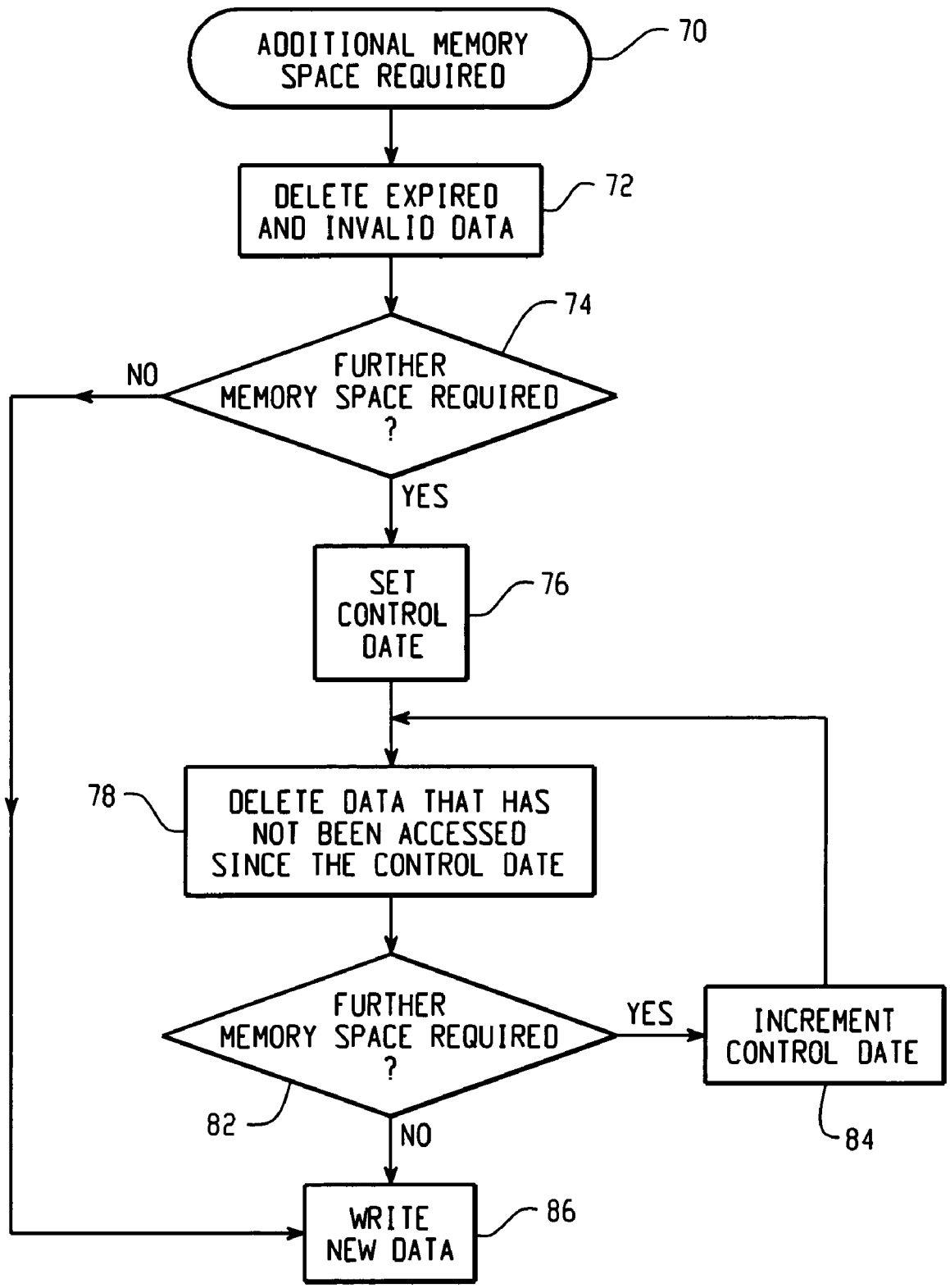
FIG. 4 is a flow diagram illustrating an example method of managing data stores.

FIG. 4 is a flow diagram illustrating a method of managing data stores. The method begins at step 70, when it is determined, by a data store management system or a system or software application that is attempting to perform a write operation, that additional memory space is required for a write operation. New data to be written may be received by a mobile device through a wireless network or a connection with a PC, or input by a user through a UI.

At step 72, multiple data stores are accessed to identify and delete expired data in the data stores. It is then determined at step 74 whether further memory space is required to write the new data after expired and invalid data has been deleted. If no further memory space is required, then the new data is written to the appropriate data store at step 86. Where further memory space is required, a control date, or other least recently used criteria, is set or otherwise determined at step 76. As described above, least recently used criteria, such as the control date in FIG. 4, may be predetermined or entered by a user. At step 78, data in multiple data stores that has not been access since the control date is identified and deleted. Although step 78 is shown as a single step in FIG. 4, it should be appreciated that multiple data stores are accessed to identify and delete any data that has not been accessed since the control date.

If the deletion of data that has not been accessed since the control date provides sufficient additional memory space for the write operation, as determined at step 82, then the new data is written to the appropriate data store at step 86. Otherwise, a later predetermined or user-specified control date may be selected at step 84, and data that has not been accessed since the later control date is identified and deleted, as described above. As described above, control dates or other least recently used criteria may be predetermined or configured.

Steps 84, 78 and 82 may be repeated until sufficient memory space is available for the write operation. Alternatively, data deletion operations may be halted when the control date is within a certain range of the current date. Control dates, a control date increment to be used between data deletion passes, and a minimum range between control date and current date at which data deletion operations should be halted are all examples of the type of data deletion control criteria that may be predetermined or configured. Since data store management may be necessary at any time, control dates and any other time-related criteria may be specified or configured relative to a current date. For example, an initial control date to be used for a first data deletion operation could be 30 days before a current date. A control date increment may be specified as 5 days per data deletion loop pass (steps 84, 78 and 82), up to a maximum of 5 days before the current date. It should be understood, however, that the above-described data deletion control criteria are illustrative examples only.

The data store management systems and methods described above access multiple data stores to identify and locate data that may be deleted to provide additional memory space for data to be written to a data store. Therefore, data is not necessarily deleted only from the particular data store into which data is to be written, and no one particular data store is pre-selected for deletion of data. Most used data is maintained in the data stores, and least recently used data, in any of a plurality of data stores, is deleted when additional memory space is required for a write operation. Data stores are thereby adapted to different usage patterns. For example, a mobile device that is used primarily for messaging may include a relatively large message store and a smaller browser cache, whereas a mobile device that is used primarily for browsing may maintain a larger browser cache and smaller message store.

Some degree of control over the adaptation of data stores may also be maintained by a user by configuring data deletion control criteria. A user may specify not only least recently used criteria, as described above, but also such criteria as whether or how often expired or invalid data should be located and deleted, and which data stores may be accessed by a data store management system to identify and delete expired, invalid, or least recently used data. Particular data stores could also be protected by specifying that data should not be deleted from such data stores by a data store management system.

Figure 5:
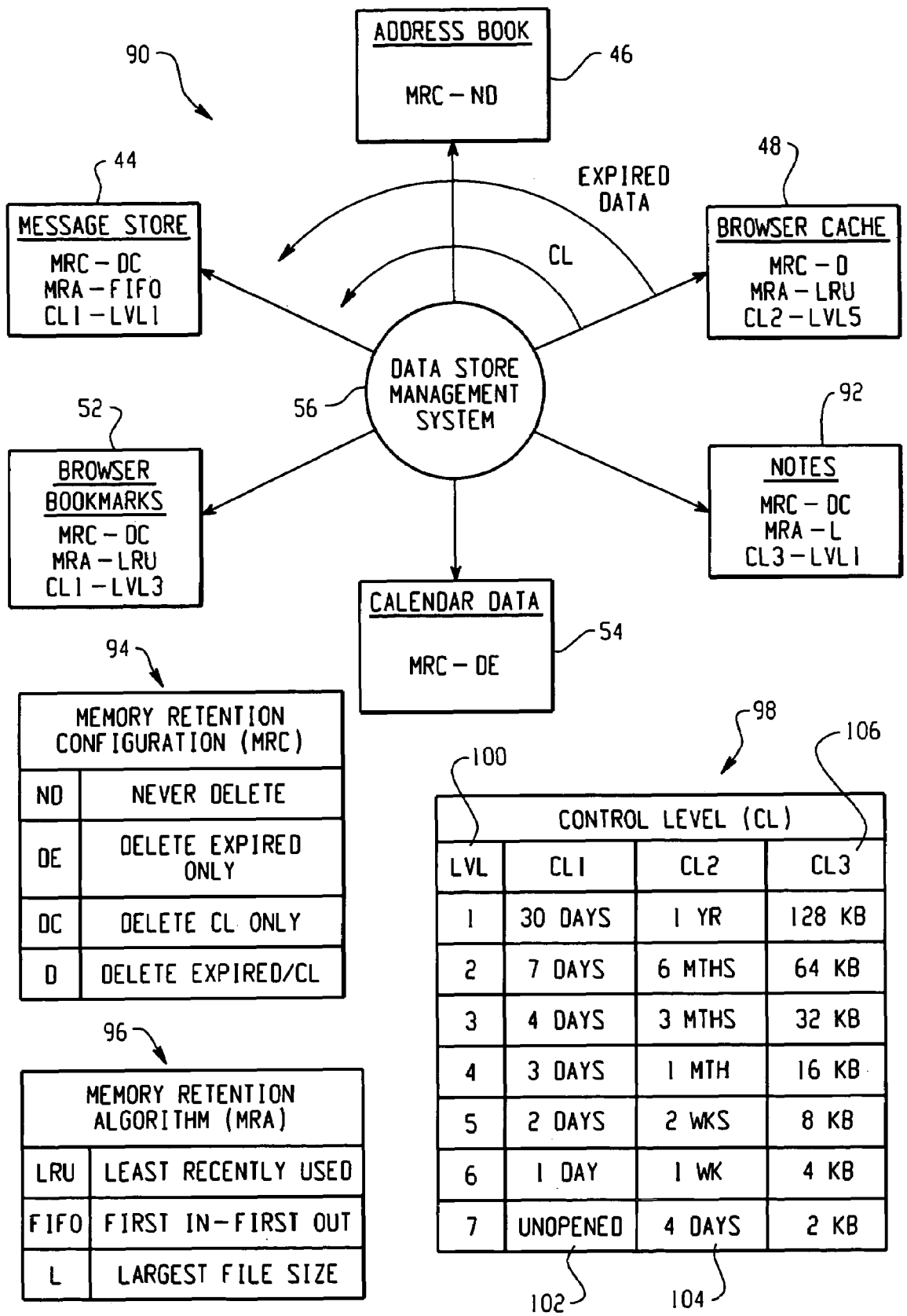
FIG. 5 is a diagram illustrating an example operation of a data store management system.

FIG. 5 is a diagram illustrating an example operation of a data store management system 56, such as the example data store management system 56 described above with reference to FIG. 3. FIG. 5 includes a block diagram 90 illustrating an example data store management configuration for a plurality of data storage areas 44, 46, 48, 52, 54, 92. Also shown in FIG. 5 are a plurality of tables 94, 96, 98, illustrating example memory retention configurations (MRCs) 94, example memory retention algorithms (MRAs) 96 and example control levels (CLs) 98 for the data storage areas 44, 46, 48, 52, 54, 92.

As illustrated, the data store management system 56 may sequentially access a plurality of data storage areas 46, 48, 52, 54, 92 to free need memory. For example, data storage areas in a mobile communication device may include a message store 44, an address book 46, a browser cache 48, a browser bookmarks store 52, a calendar data store 54, a notes store 92, or others. If additional memory is needed for the mobile communication device to store new data to any one or more data storage area 44, 46, 48, 52, 54, 92, then the data store management system 56 may sequentially access the data storage areas 44, 46, 48, 52, 54, 92 to release stored data from memory, and may continue this sequential process until the needed memory space is available. In addition, the data store management configuration applied by the data store management system 56 to release data from memory may be customized for each data storage area 44, 46, 48, 52, 54, 92.

In the example of FIG. 5, the data store management configurations applied by the data store management system 56 to the data storage areas 44, 46, 48, 52, 54, 92 may specify a memory retention configuration 94, a memory retention algorithm 96 and a control level 98. Example memory retention configurations 94 include an option ("ND") to never delete stored data from a particular data storage area, an option ("DE") to delete only expired data from a particular data storage area, an option ("DC") to delete data from a particular data storage area according to a designated control level (CL), or an option ("D") to delete both expired data and data satisfying a control level (CL) requirement from a particular data storage area. Example memory retention algorithms 96 which may be applied to a particular data storage area include a least recently used (LRU) algorithm, a first in-first out (FIFO) algorithm, and a largest file size (L) algorithm. Example control levels 98 which may be applied to a particular data storage area may designate that the data store management system 56 release data from memory that has not been accessed for a particular period of time (e.g., CL1 and CL2) or that is of a particular file size (e.g., CL3). It should be understood, however, that the data store management configurations illustrated in tables 94, 96 and 98 are illustrative of example configurations, and other configurations could also be utilized by the data store management system 56.

The block diagram 90 shown in FIG. 5 illustrates one example memory retention configuration. In this example, a device application (e.g., a messaging application, an address book application, a browser application, or others) that requires additional memory to store new data may access the data store management system 56, as described above with reference to FIG. 3. The data store management system 56 may then access the data storage locations in a sequential fashion to delete expired data, if allowed by the particular memory retention configuration for the particular data storage location. For example, the data store management system 56 may first access the data store locations 48, 54 that are configured to allow the deletion of expired or invalid data. For example, the browser cache 48 may be accessed to delete expired web pages, and the calendar data location 54 may be accessed to delete appointment information occurring in the past.

If additional memory is needed after the expired data has been deleted, then the data store management system 56 may sequentially access the data storage locations 44, 46, 48, 52, 54, 92 to delete additional data in accordance with a designated control level(s) 98. For example, in the illustrated embodiment, the browser cache 48, message store 44, browser bookmarks 52, and notes store 92 are each configured to allow the deletion of data at a designated control level 98. For instance, the browser cache 48 is configured to allow the deletion of data in accordance with control level scheme "CL2" 104 and starting with control level 5 (LVL5). With referencing to the control level table 98, the control level configuration of the browser cache 48 thus allows the deletion of data that is at least two (2) weeks old. Similarly, the illustrated message store 44 allows data to be deleted that is at least 30 days old (CL1-LVL1), the browser bookmarks location 52 allows deletion of 4 day old data (CL1-LVL3), and the notes storage location 92 allows files to be deleted that are 128 kb or greater (CL3-LVL1). The data store management system 56 may access these data storage locations 44, 48, 52, 92 in a sequential fashion to delete data in accordance with the designated control level 98 until sufficient memory is available.

If additional memory is still required after each data storage location 44, 48, 52, 92 has been accessed at its designated control level 98, then the data store management system 56 may increment the designated control level and begin the control level deletion process again. For example, if additional memory is needed in the example of FIG. 5, then the control level of the browser cache 48 may be incremented to level 6 (CL2-LVL6), the message store 44 may be incremented to control level 2 (CL1-LVL2), the browser bookmarks store 52 may be incremented to control level 4 (CL1-LVL4), and the notes storage location 92 may be incremented to control level 2 (CL3-LVL2).

In addition, each data storage location 44, 46, 48, 52, 54, 92 may be configured to delete data in accordance with a particular memory retention algorithm (MRA) 96. For example, the illustrated browser cache 48 and browser bookmark store 52 are configured to delete data using an LRU memory retention algorithm. That is, data satisfying the control level designation is deleted from the browser cache 48 and bookmark store 52 in order according to how often the data was accessed. The illustrated message store 44 is configured to delete data using a FIFO algorithm, under which older data satisfying the control level designation is deleted first. The illustrated notes store 92 is configured to delete data using a largest file size algorithm, which requires that larger files satisfying the control level designation are deleted first.

Figure 6:
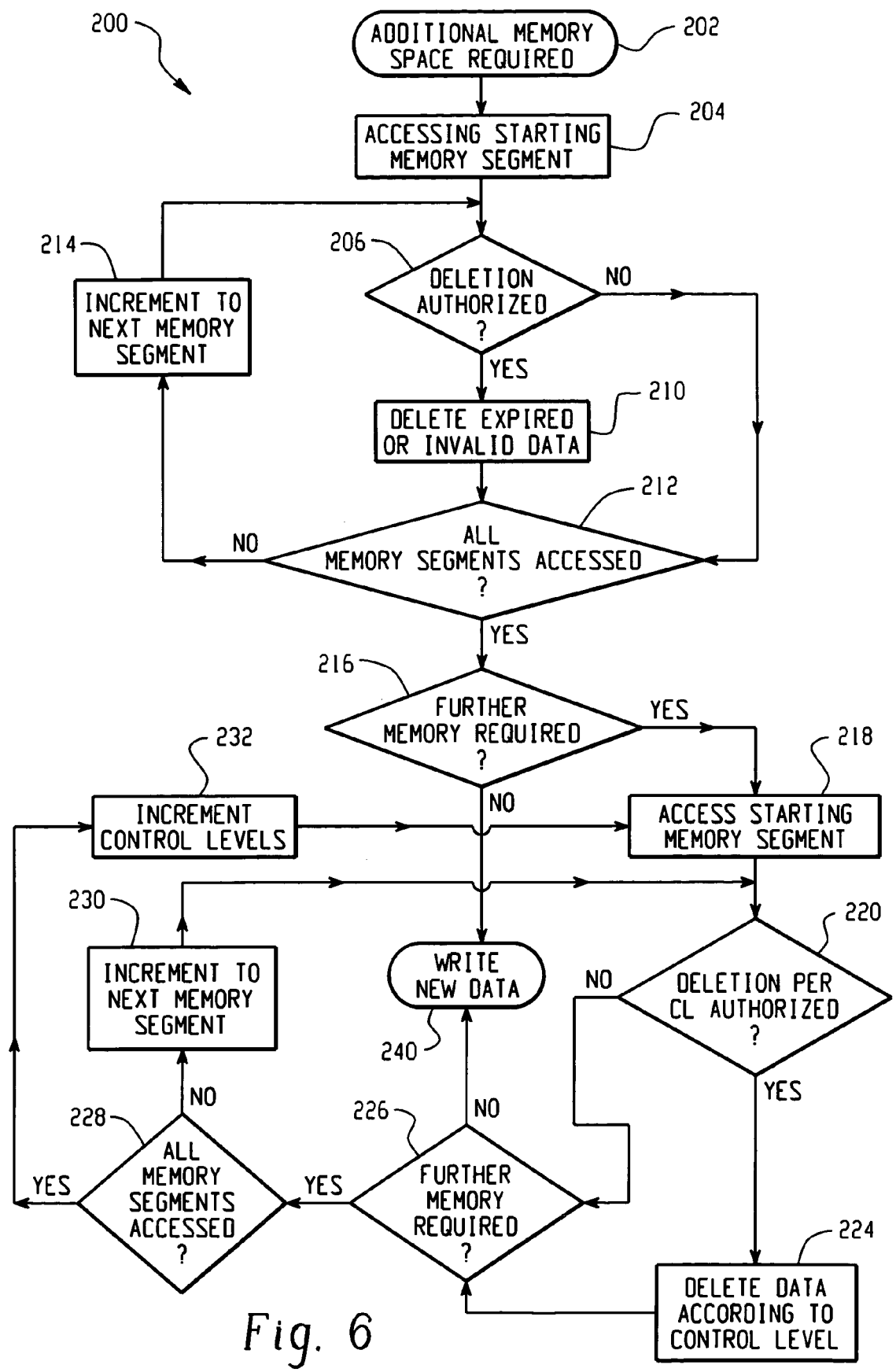
FIG. 6 is a flow diagram illustrating an example method of operation for a data store management system.

FIG. 6 is a flow diagram 200 illustrating an example method of operation for a data store management system. At step 202, an instruction is received by the data store management system indicating that additional memory space is required for a data storage operation. In response, a starting memory segment is accessed in step 204. A particular data storage area, such as the message store, address book store, browser cache or others, may be designated as the starting memory segment which is accessed first when additional memory is needed to store new data. Alternatively, two or more messages stores may alternate as the starting memory store. In any case, upon accessing the starting memory store, the method determines at step 206 if deletion is authorized under the data store management configuration for the particular memory store. If deletion is not authorized, then the method skips to step 212. Otherwise, if deletion is authorized, then at step 210 expired or invalid data is deleted from the starting memory segment, as described above.

At step 212, the method determines if all available data storage locations have been accessed. If not, then the method increments to the next data storage location at step 214, and the method returns to step 206. Otherwise, if all of the data storage locations have been accessed, then the method proceeds to step 216.

At step 216, the method determines if further memory is required for the data storage operation. If no additional memory is required, then the method proceeds to step 240, and the new data is written to device memory. If additional memory is required, however, then the starting memory segment is again accessed at step 218. Upon accessing the starting memory segment, it is determined at step 220 if control level deletion is authorized for the particular memory store, as described above with reference to FIG. 5. If control level deletion is not authorized, then the method skips to step 226. Otherwise, if control level deletion is authorized, then the method proceeds to step 224, and data is deleted from the memory store in accordance with the current control level, as described above with reference to FIG. 5.

At step 226, the method again determines if further memory is required for the data storage operation. If no additional memory is required, then the method proceeds to step 240, and the new data is written to the appropriate data storage location. If additional memory is required, however, then the method determines at step 228 whether all memory segments have been accessed for control level deletion. If all memory segments have not been accessed, then the method increments to the next data storage location at step 230, and the method returns to step 220. If all memory segments have been accessed, however, then the method increments the control level configuration of the data storage locations, as described above with reference to FIG. 5, and the method returns to step 218.

Figure 7:
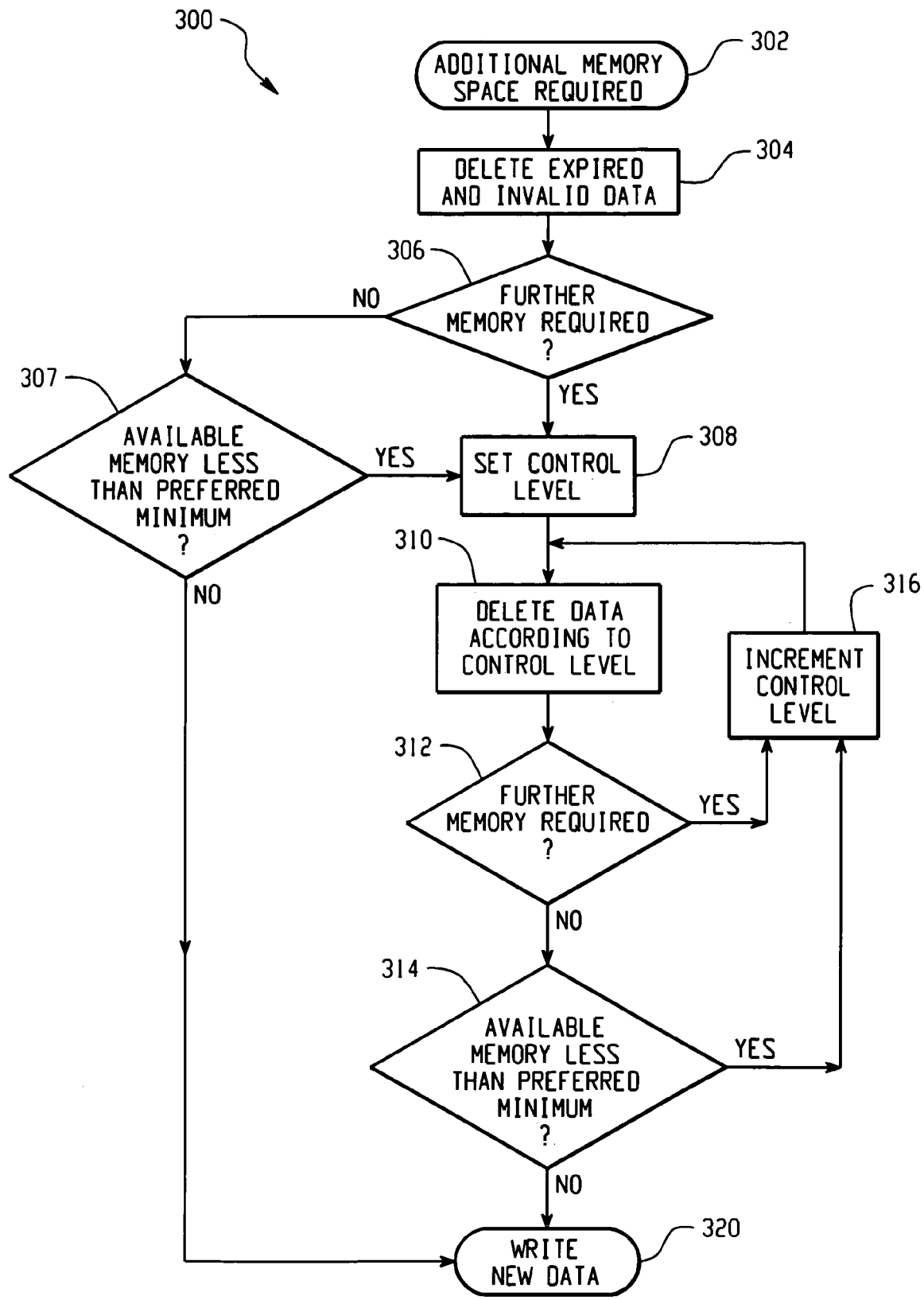
FIG. 7 is a flow diagram illustrating an example method of managing data stores to provide a preferred minimum amount of available memory.

FIG. 7 is a flow diagram 300 illustrating an example method of managing data stores to provide a preferred minimum amount of available memory. At step 302, an instruction is received by the data store management system indicating that additional memory space is required for a data storage operation. In response, at step 304 expired and invalid data is deleted from two or more data stores, as described above. The method then determines at step 306 if additional memory space is required to perform the memory storage operation. If no additional memory is required, then the method proceeds to step 307. Otherwise, if additional memory is required, then the method proceeds to step 308.

At step 307, the method determines if the available memory is less than a preferred minimum level. If at least the preferred minimum amount of memory is available, then the method proceeds to step 320, and the new data is written to the appropriate data storage location. If less than the preferred minimum amount of memory is available, however, then the method proceeds to step 308 in order to free additional memory. By maintaining this minimum amount of available memory, the method helps to avoid a condition in which additional memory must be freed each time a data storage operation is performed. That is, the minimum memory level may free the memory required for the next one or more data storage operations, and may thus reduce the amount of processing required by the data store management system 56.

At step 308, one or more control levels are set for the data storage locations. Data is then deleted from the data storage locations at step 310 in accordance with the control level configuration(s), as describe above with reference to FIG. 5. The method again determines at step 312 whether additional memory is required to perform the data storage operation. If no additional memory is required, then the method proceeds to step 314. If additional memory is required for the data storage operation, however, then the control level(s) is incremented at step 316, and the method returns to step 310.

At step 314, the method determines if the available memory is less than the preferred minimum level. If at least the preferred minimum amount of memory is available, then the method proceeds to step 320, and the new data is written to the appropriate data storage location. If less than the preferred minimum amount of memory is available, however, then the control level(s) is incremented at step 316, and the method returns to step 310 to free additional memory.

Figure 8:
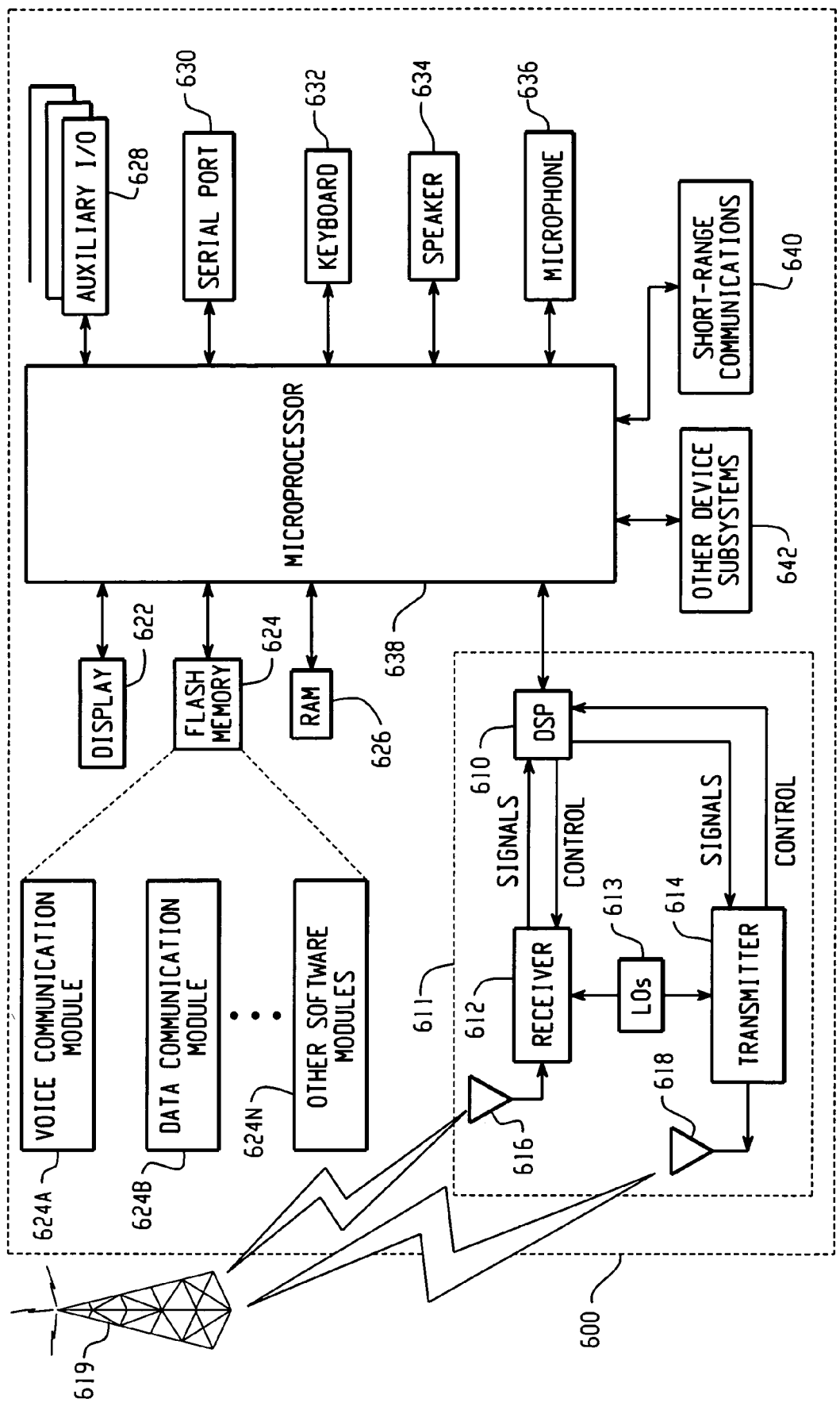
FIG. 8 is a block diagram of an example wireless mobile communication device in which systems and methods of data store management may be implemented.

FIG. 8 is a block diagram of an example mobile device 600 in which systems and methods of data store management may be implemented. The mobile device 600 may be a two-way communication device having voice and data communication capabilities. The mobile device 600 may have the capability to communicate with other computer systems on the Internet.

The example mobile device 600 includes a transceiver 611, a microprocessor 638, a display 622, Flash memory 624, RAM 626, auxiliary input/output (I/O) devices 628, a serial port 630, a keyboard 632, a speaker 634, a microphone 636, a short-range wireless communications sub-system 640, and may also include other device sub-systems 642. The transceiver 611 includes transmit and receive antennas 616, 618, a receiver (Rx) 612, a transmitter (Tx) 614, one or more local oscillators (LOs) 613, and a digital signal processor (DSP) 620. Within the Flash memory 624, the device 600 includes a plurality of software modules 624A-624N that can be executed by the microprocessor 638 (and/or the DSP 620), including a voice communication module 624A, a data communication module 624B, and a plurality of other operational modules 624N for carrying out a plurality of other functions. The data store management system 56, the messaging system 60, the browser 62 and the calendar system 64 shown in FIG. 3, may all be implemented as software modules in the Flash memory 624, RAM 626 or another memory in the mobile device 600. Any of these memories may be configured to include data stores, any or all of which may be managed as described above.

The mobile device 600 may be a two-way communication device having voice and data communication capabilities. Thus, for example, the mobile device 600 may communicate over a voice network, such as any of the analog or digital cellular networks, and may also communicate over a data network. The voice and data networks are depicted in FIG. 8 by the communication tower 619. These voice and data networks may be separate communication networks using separate infrastructure (e.g., base stations, network controllers, etc.), or may be integrated into a single wireless network. References to the network 619 should therefore be interpreted as encompassing both a single voice and data network and separate networks.

The communication subsystem 611 is used to communicate with the network 619. The DSP 620 is operable to send and receive communication signals to and from the transmitter 614 and receiver 612, and may also exchange control information with the transmitter 614 and receiver 612. If the voice and data communications occur at a single frequency, or closely-spaced set of frequencies, then a single LO 613 may be used in conjunction with the transmitter 614 and receiver 612. Alternatively, if different frequencies are utilized for voice communications versus data communications, then a plurality of LOs 613 may be used to generate a plurality of frequencies corresponding to the network 619. Although two antennas 616, 618 are depicted in FIG. 8, the mobile device 600 could be used with a single antenna structure. Information, which includes both voice and data information, is communicated to and from the communication module 611 via a link between the DSP 620 and the microprocessor 638.

The design of the communication subsystem 611, such as frequency band, component selection, power level, etc., is dependent upon the communication network 619 in which the mobile device 600 is intended to operate. For example, a mobile device 600 intended to operate in a North American market may include a communication subsystem 611 designed to operate with the Mobitex or DataTAC mobile data communication networks and also designed to operated with any of a variety of voice communication networks (e.g., AMPS, TDMA, CDMA, PCS, etc.). A mobile device 600 intended for use in Europe may be configured to operate with the GPRS data communication network and the GSM voice communication network. Other types of data and voice networks, both separate and integrated, may also be utilized with the mobile device 600.

Depending upon the type of network 619, the access requirements for the mobile device 600 may also vary. For example, in the Mobitex and DataTAC data networks, mobile devices are registered on the network using a unique identification number associated with each device. In GPRS data networks, however, network access is associated with a subscriber or user of a mobile device 600. A GPRS device typically requires a subscriber identity module ("SIM"), which is required in order to operate the mobile device 600 on a GPRS network. Local or non-network communication functions (if any) may be operable, without the SIM, but the mobile device 600 will be unable to carry out any functions involving communications over the network 619, other than any legally required operations, such as '911' emergency calling.

After any required network registration or activation procedures have been completed, the mobile device 600 may send and receive communication signals over the network 619. Signals received by the antenna 616 from the communication network 619 are routed to the receiver 612, which provides for signal amplification, frequency down conversion, filtering, channel selection, etc., and may also provide analog to digital conversion. Analog to digital conversion of the received signal allows more complex communication functions, such as digital demodulation and decoding to be performed using the DSP 620. In a similar manner, signals to be transmitted to the network 619 are processed, including modulation and encoding, for example, by the DSP 620 and are then provided to the transmitter 614 for digital to analog conversion, frequency up conversion, filtering, amplification and transmission to the communication network 619 via the antenna 618. Although a single transceiver 611 is shown in FIG. 8 for both voice and data communications, it is possible that the mobile device 600 may include two distinct transceivers, a first transceiver for transmitting and receiving voice signals, and a second transceiver for transmitting and receiving data signals.

In addition to processing the communication signals, the DSP 620 may also provide receiver and transmitter control. For example, the gain levels applied to communication signals in the receiver 612 and transmitter 614 may be adaptively controlled through automatic gain control algorithms implemented in the DSP 620. Other transceiver control algorithms could also be implemented in the DSP 620 in order to provide more sophisticated control of the transceiver 611.

The microprocessor 638 manages and controls the overall operation of the mobile device 600. Many types of microprocessors or microcontrollers could be used. Alternatively, a single DSP 620 could be used to carry out the functions of the microprocessor 638. Low-level communication functions, including at least data and voice communications, are performed through the DSP 620 in the transceiver 611. Other, high-level communication applications, such as a voice communication application 624A, and a data communication application 624B may be stored in the Flash memory 624 for execution by the microprocessor 638. For example, the voice communication module 624A may provide a high-level user interface operable to transmit and receive voice calls between the mobile device 600 and a plurality of other voice devices via the network 619. Similarly, the data communication module 624B may provide a high-level user interface operable for sending and receiving data (e.g., e-mail messages, files, organizer information, short text messages, etc.) between the mobile device 600 and a plurality of other data devices via the network 619.

The microprocessor 638 also interacts with other device subsystems, such as the display 622, Flash memory 624, random access memory (RAM) 626, auxiliary input/output (I/O) subsystems 628, serial port 630, keyboard 632, speaker 634, microphone 636, a short-range communications subsystem 640 and any other device subsystems generally designated as 642. For example, the modules 624A-N are executed by the microprocessor 638 and may provide a high-level interface between a user of the mobile device and the mobile device. This interface typically includes a graphical component provided through the display 622, and an input/output component provided through the auxiliary I/O 628, keyboard 632, speaker 634, or microphone 636.

Some of the subsystems shown in FIG. 8 perform communication-related functions, whereas other subsystems may provide "resident" or on-device functions. Some subsystems, such as keyboard 632 and display 622 may be used for both communication-related functions, such as entering a text message for transmission over a data communication network, and device-resident functions such as a calculator or task list or other PDA type functions.

Operating system software used by the microprocessor 638 is preferably stored in a persistent store such as Flash memory 624. In addition to the operating system and communication modules 624A-N, the Flash memory 624 may also include a file system and data stores for storing data. The operating system, specific device applications or modules, or parts thereof, may be temporarily loaded into a volatile store, such as RAM 626 for faster operation. Moreover, received communication signals may also be temporarily stored to RAM 626, before permanently writing them to a file system located in the persistent store 624. Data stores provided in any memory component on the mobile device 600 may be managed, as described above.

An exemplary application module 624N that may be loaded onto the mobile device 600 is a PIM application providing PDA functionality, such as calendar events, appointments, and task items. Such a module may store PIM data to one or more appropriate data stores, in Flash memory 624 or RAM 626 for example. This module 624N may also interact with the voice communication module 624A for managing phone calls, voice mails, etc., and may also interact with the data communication module 624B for managing e-mail communications and other data transmissions. Alternatively, all of the functionality of the voice communication module 624A and the data communication module 624B may be integrated into the PIM module. Any or all of these modules may be further configured to interact with a data store management system.

The Flash memory 624 may provide a file system to facilitate storage of PIM data items on the device. The PIM application may include the ability to send and receive data items, either by itself, or in conjunction with the voice and data communication modules 624A, 624B, via the wireless network 619. The PIM data items are preferably seamlessly integrated, synchronized and updated, via the wireless network 619, with a corresponding set of data items stored or associated with a host computer system, thereby creating a mirrored system for data items associated with a particular user.

The mobile device 600 may also be manually synchronized with a host system by placing the mobile device 600 in an interface cradle, which couples the serial port 630 of the mobile device 600 to the serial port of the host system. The serial port 630 may also be used to enable a user to set preferences through an external device or software application, to download other application modules 624N for installation, and to load Certs onto a device as described above. This wired download path may be used to load an encryption key onto the device, which is a more secure method than exchanging encryption information via the wireless network 619.

Additional application modules 624N may be loaded onto the mobile device 600 through the network 619, through an auxiliary I/O subsystem 628, through the serial port 630, through the short-range communications subsystem 640, or through any other suitable subsystem 642, and installed by a user in the Flash memory 624 or RAM 626. Such flexibility in application installation increases the functionality of the mobile device 600 and may provide enhanced on-device functions, communication-related functions, or both. For example, secure communication applications may enable electronic commerce functions and other such financial transactions to be performed using the mobile device 600.

When the mobile device 600 is operating in a data communication mode, a received signal, such as a text message or a web page download, will be processed by the transceiver 611 and provided to the microprocessor 638, which will preferably further process the received signal for output to the display 622, or, alternatively, to an auxiliary I/O device 628. A user of mobile device 600 may also compose data items, such as email messages, using the keyboard 632, which is preferably a complete alphanumeric keyboard laid out in the QWERTY style, although other styles of alphanumeric keyboards may also be used. User input to the mobile device 600 is further enhanced with a plurality of auxiliary I/O devices 628, which may include a thumbwheel input device, a touchpad, a variety of switches, a rocker input switch, or other I/O devices. The composed data items input by the user may then be transmitted over the communication network 619 via the transceiver 611.

When the mobile device 600 is operating in a voice communication mode, the overall operation of the mobile device 600 is substantially similar to the data mode, except that received signals are preferably output to the speaker 634 and voice signals for transmission are generated by a microphone 636. In addition, the secure messaging techniques described above might not necessarily be applied to voice communications. Alternative voice or audio I/O subsystems, such as a voice message recording subsystem, may also be implemented on the mobile device 600. Although voice or audio signal output is preferably accomplished primarily through the speaker 634, the display 622 may also be used to provide an indication of the identity of a calling party, the duration of a voice call, or other voice call related information. For example, the microprocessor 638, in conjunction with the voice communication module 624A and the operating system software, may detect the caller identification information of an incoming voice call and display it on the display 622.

A short-range communications subsystem 640 may also be included in the dual-mode device 600. For example, the subsystem 640 may include an infrared device and associated circuits and components, or a short-range wireless communication module such as a Bluetooth™ communication module or an 802.11 communication module to provide for communication with similarly-enabled systems and devices. This short-range communications subsystem 640 represents another communication module through which data may be loaded onto a messaging client such as the device 600.

This written description uses examples to disclose the invention, including the best mode, and also to enable a person skilled in the art to make and use the invention. The patentable scope of the invention may include other examples that occur to those skilled in the art.

INDUSTRIAL APPLICABILITY

The invention provides a data store management system and method that is particularly well-suited for use with a mobile communication device.

The invention claimed is:

1. A system for managing memory space in a mobile device, comprising:
    a plurality of data storage locations;
    a plurality of software applications, each software application being operable to store data files to a different storage location; and
    a data store management system configured to access and delete data files in the plurality of data storage locations,
    the data store management system providing a plurality of memory retention algorithms, wherein one of the plurality of memory retention algorithms is selected by a user to determine a criteria used to select data files for deletion from the plurality of data storage locations,
    the data store management system further providing a plurality of control levels, the plurality of control levels providing threshold levels for selecting data files for deletion according to the selected memory retention algorithm, wherein a control level is selected to set a threshold level for the selected memory retention algorithm so data files at or above the threshold level are deleted,
    wherein the data store management system is further configured to receive an initial control level and delete one or more data files according to the initial control level and the selected memory retention algorithm, and if sufficient memory space is not available after deleting data files according to the initial control level and the selected memory retention algorithm, then increment the initial control level and delete one or more additional data files according to the incremented control level,
    wherein the threshold level associated with the control level becomes progressively lower as the selected control level is incremented.

2. The system of claim 1, wherein the plurality of memory retention algorithms include a least recently used algorithm, a first in-first out algorithm and a largest file size algorithm.

3. The system of claim 1, wherein the data store management system is further configured to provide a plurality of selectable groups of control levels, wherein the plurality of control levels are translated to different threshold levels dependant upon the selected control level group.

4. The system of claim 3, wherein the plurality of selectable groups of control levels include a group having threshold levels relating to file size.

5. The system of claim 3, wherein the plurality of selectable groups of control levels include a group having threshold levels relating to the amount of time since a data file has been accessed.

6. The system of claim 1, wherein the plurality of data storage locations include at least one of a browser cache, a message store, an address book, a browser bookmarks store, a calendar data store, a notes store, and an electronic messaging store.

7. The system of claim 1, wherein the plurality of software applications include at least one of an electronic messaging system, an Internet browser application and a calendar application.

8. A computer implemented method for managing memory space in a mobile device, comprising:
    storing data flies in memory;
    selecting one of a plurality of memory retention algorithms for deleting sufficient data in memory to yield sufficient free memory space in the memory; and
    setting a control level to provide a threshold level used by the selected memory retention algorithm to select data files for deletion according to the selected memory retention algorithm, wherein the control level is selected to set the threshold level for the selected memory retention algorithm so data files at or above the threshold level are deleted;

receiving an initial control level;

deleting one or more data files according to the initial control level and the selected memory retention algorithm;

determining if sufficient free memory space is available; and if sufficient free memory space is not available after deleting data files according to the initial control level and the selected memory retention algorithm, then incrementing the initial control level and deleting one or more additional data files according to the incremented control level and the selected memory retention algorithm, wherein the threshold level associated with the control level becomes progressively lower as the control level is incremented.

9. The method of claim 8, wherein the plurality of memory retention algorithms include a least recently used algorithm, a first in-first out algorithm and a largest file size algorithm.

10. The method of claim 8, further comprising:

selecting one group of control levels from a plurality of groups of control levels, wherein the control level is set from the selected group of control levels, and wherein the control level is translated to a different threshold level dependant upon the selected control level group.

11. The method of claim 10, wherein the plurality of selectable groups of control levels include a group having threshold levels relating to file size.

12. The method of claim 10, wherein the plurality of selectable groups of control levels include a group having threshold levels relating to the amount of time since a data file has been accessed.

* * * * *

UNITED STATES PATENT AND TRADEMARK OFFICE
CERTIFICATE OF CORRECTION

| | |
|---|---|
| PATENT NO. | : 7,353,350 B2 |
| APPLICATION NO. | : 10/521872 |
| DATED | : April 1, 2008 |
| INVENTOR(S) | : Klassen et al. |

It is certified that error appears in the above-identified patent and that said Letters Patent is hereby corrected as shown below:

Column 18, line 59, please replace "data flies" with -- data files --

Signed and Sealed this

Eighteenth Day of May, 2010

David J. Kappos
*Director of the United States Patent and Trademark Office*